P. THEUERKORN.
APPARATUS FOR LINING TUBES WITH LEAD, TIN, OR THE LIKE.
APPLICATION FILED AUG. 4, 1911.
1,078,387.
Patented Nov. 11, 1913.
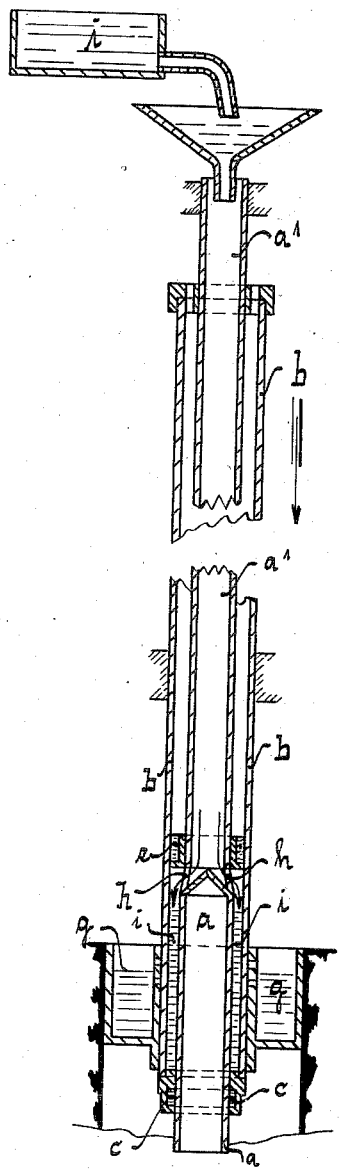
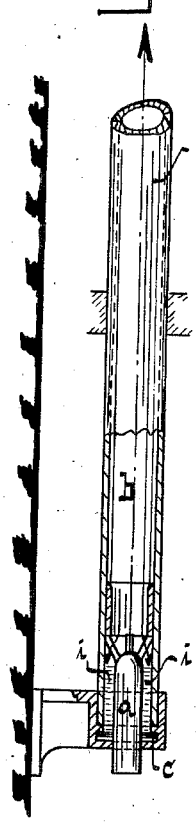
Witnesses
Inventor

UNITED STATES PATENT OFFICE.

PAUL THEUERKORN, OF CHEMNITZ, GERMANY, ASSIGNOR TO MANN AND WILLKOMM, AKTIENGESELLSCHAFT, OF HEIDENAU, DRESDEN, GERMANY.

APPARATUS FOR LINING TUBES WITH LEAD, TIN, OR THE LIKE.

1,078,387.

Specification of Letters Patent.   Patented Nov. 11, 1913.

Original application filed April 3, 1911, Serial No. 618,679. Divided and this application filed August 4, 1911. Serial No. 642,405.

*To all whom it may concern:*

Be it known that I, PAUL THEUERKORN, a subject of the Emperor of Germany, residing at Chemnitz, Germany, have invented Improvements in Apparatus for Lining Tubes with Lead, Tin, or the like, of which the following is a specification.

This invention relates to an improved method of lining tubes and the like with lead, tin or the like, and to apparatus therefor and this application is divided from my pending application Serial No. 618679 dated April 3rd, 1911.

To provide metal tubes, such as copper tubes for example, with a lining of lead, tin, or the like, various methods have been employed. In the lining of tubes of large bore a centrifugal process has been employed but in the case of long tubes, such as tubes say from three to six meters long this process could not be employed as it is quite impossible to obtain a uniform union of the metal lining with the tube at all points in such a process; moreover the centrifugal process cannot be carried out in the case of tubes to the lining of which this invention particularly relates and which in many cases, are only five centimeters in diameter.

Metal when employed in the liquid state and gradually brought into contact with the surfaces to be lined unites uniformly with such surfaces, even over great lengths thereof, and the improved method of lining hereinafter described is based upon this fact. According to this invention the tube to be lined is placed over a core, a collar or flange closing the space between the tube and the core, and the metal in a liquid state is then poured into the said space above such collar or flange in suchwise that the lower end of the tube is first lined and by gradual relative vertical movement of the tube and core the other and upper part of the tube is gradually lined, the metal uniting uniformly with the entire surface covered. Conveniently the core is stationary and the tube is moved vertically over the core, although in lining long tubes, the tube to be lined can be stationary, and the core be moved upwardly gradually while the liquid metal is being applied.

Figure 1 of the accompanying illustrative drawings is a diagrammatic sectional view showing apparatus for lining a tube according to this invention. Fig. 2 is a sectional view illustrating apparatus for lining long tubes according to this invention.

In the apparatus shown in Fig. 1 the tubes to be lined are moved downwardly during the operation. In the apparatus shown in Fig. 2 the tubes are held stationary during the operation.

When lining tubes as with lead for example the operation is as follows:—The core $a$, Fig. 1 is stationary and is connected to a metal supply pipe $a^1$. At the point where the core $a$ and the supply pipe $a^1$ are connected openings $h$ are formed, and the core $a$ is closed at the top, as shown, or it may be solid, so that the liquid metal must flow outwardly over the core. The tube $b$ to be lined is, at the commencement of the operation in a higher position to that shown, so that the inwardly projecting collar $c$ thereon which closes the tube at the bottom around the core $a$ is near the openings $h$ for the fluid metal. As the liquid metal $i$ flows into the tube to be lined the tube is gradually and uniformly lowered, whereby the inner surface thereof is uniformly covered with a lining of metal. After having been cooled by the water jacket at $g$ the lined tube $b$ is moved downwardly over the stationary-core $a$.

The improved method of lining has also an advantage in that the finished tube does not have to be forcibly drawn from the mold, as it gradually emerges therefrom during the operation of lining and but little power is required to feed the tube forward as it is moved continuously from start to finish.

In the case of long tubes much space would be occupied if the tubes had to be moved as described over the core during the lining operation, for example if lining a tube four meters long at least eight meters of space would be necessary because the tube to be lined would say project four meters above the core at the commencement of the operation and four meters below the core at the end of the operation. To obviate this disadvantage the tube $b$ to be lined can be held stationary during the operation as shown in Fig. 2 and the core be arranged to slide upward vertically while the lining of the tube is being effected. As in the apparatus shown in Fig. 1 the lead or other covering material *i* is deposited upon the lower part of the tube first and then gradually upon the other and upper part of the tube as the core *a* rises, in this way the lining is uniform and unites perfectly with the surfaces being covered.

What I claim is:—

1. Apparatus for lining tubes with lead, tin or the like comprising a stationary core, a metal supply pipe forming a continuation of said core and formed with perforations at the part where it is connected to the said core, a collar adapted to slide in a fluid tight manner over said core and to fit a tube to be lined, and a stationary water jacket through which a tube to be lined can slide.

2. Apparatus for lining tubes with lead, tin or the like comprising a stationary core the upper end of which is coned, a metal supply pipe forming a continuation of said core and formed with downwardly inclined perforations at the part where it is connected to the said core, a collar adapted to slide in a fluid tight manner over said core and to fit a tube to be lined, and a stationary water jacket through which a tube to be lined can slide.

Signed at Chemnitz, Saxony, Germany this 18th day of July, 1911.

PAUL THEUERKORN.

Witnesses:
WM. WASHINGTON BRUNSWICK,
SIDNEY RICH.